United States Patent
Zhang et al.

(10) Patent No.: US 8,754,984 B2
(45) Date of Patent: Jun. 17, 2014

(54) SYSTEM AND METHOD FOR VIDEO CAPTION RE-OVERLAYING FOR VIDEO ADAPTATION AND RETARGETING

(75) Inventors: Dong-Qing Zhang, Plainsboro, NJ (US); Hong Heather Yu, West Windsor, NJ (US)

(73) Assignee: Futurewei Technologies, Inc., Plano, TX (US)

(*) Notice: Subject to any disclaimer, the term of this patent is extended or adjusted under 35 U.S.C. 154(b) by 91 days.

(21) Appl. No.: 13/198,024

(22) Filed: Aug. 4, 2011

(65) Prior Publication Data

US 2012/0281139 A1 Nov. 8, 2012

Related U.S. Application Data

(60) Provisional application No. 61/481,421, filed on May 2, 2011.

(51) Int. Cl.
| | |
|---|---|
| H04N 7/00 | (2011.01) |
| H04N 11/00 | (2006.01) |
| H04N 9/12 | (2006.01) |
| H04N 5/14 | (2006.01) |
| H04N 9/64 | (2006.01) |
| H04N 5/445 | (2011.01) |
| H04N 7/01 | (2006.01) |
| H04N 11/20 | (2006.01) |
| H04N 7/16 | (2011.01) |

(52) U.S. Cl.
USPC .......... 348/468; 348/383; 348/571; 348/563; 348/564; 348/448; 725/136

(58) Field of Classification Search
None
See application file for complete search history.

(56) References Cited

U.S. PATENT DOCUMENTS

| | | | | |
|---|---|---|---|---|
| 6,097,442 A | * | 8/2000 | Rumreich et al. | 348/563 |
| 6,348,951 B1 | * | 2/2002 | Kim | 348/564 |
| 8,063,984 B2 | * | 11/2011 | Yamauchi | 348/448 |
| 2006/0164542 A1 | * | 7/2006 | Kondo | 348/383 |
| 2006/0288399 A1 | * | 12/2006 | Tierney et al. | 725/136 |
| 2007/0296866 A1 | * | 12/2007 | Fujisawa | 348/571 |

FOREIGN PATENT DOCUMENTS

| | | |
|---|---|---|
| CN | 1956541 | 5/2007 |
| CN | 101043609 A | 9/2007 |

OTHER PUBLICATIONS

Notification of Transmittal of the International Search Report and the Written Opinion of the International Searching Authority, or the Declaration, PCT/CN2011/082511, mailed Mar. 1, 2012, 9 pages.
Pérez, P., et al., "Poisson Image Editing," Microsoft Research UK, 2003, pp. 313-318, 0730-0301/03/0700-0313, ACM.
Zhang, D-Q., et al., "Temporally Consistent Caption Detection in Videos Using a Spatiotemporal 3D Method," ICIP 2009, pp. 1881-1884, IEEE.
Zhang, D., et al., "General and Domain-Specific Techniques for Detecting and Recognizing Superimposed Text in Video," International Conference on Image Processing, 2002, pp. I-593-I-596, vol. I, IEEE.

* cited by examiner

*Primary Examiner* — Jefferey Harold
*Assistant Examiner* — Sean Haiem
(74) *Attorney, Agent, or Firm* — Slater & Matsil, L.L.P.

(57) ABSTRACT

In accordance with an embodiment, a method of processing an electronic image having caption text includes receiving the electronic source image, detecting the caption text in the electronic source image, reformatting the electronic source image, reformatting the caption text, and overlaying the reformatted caption text on the reformatted electronic image to form a resultant image.

22 Claims, 3 Drawing Sheets

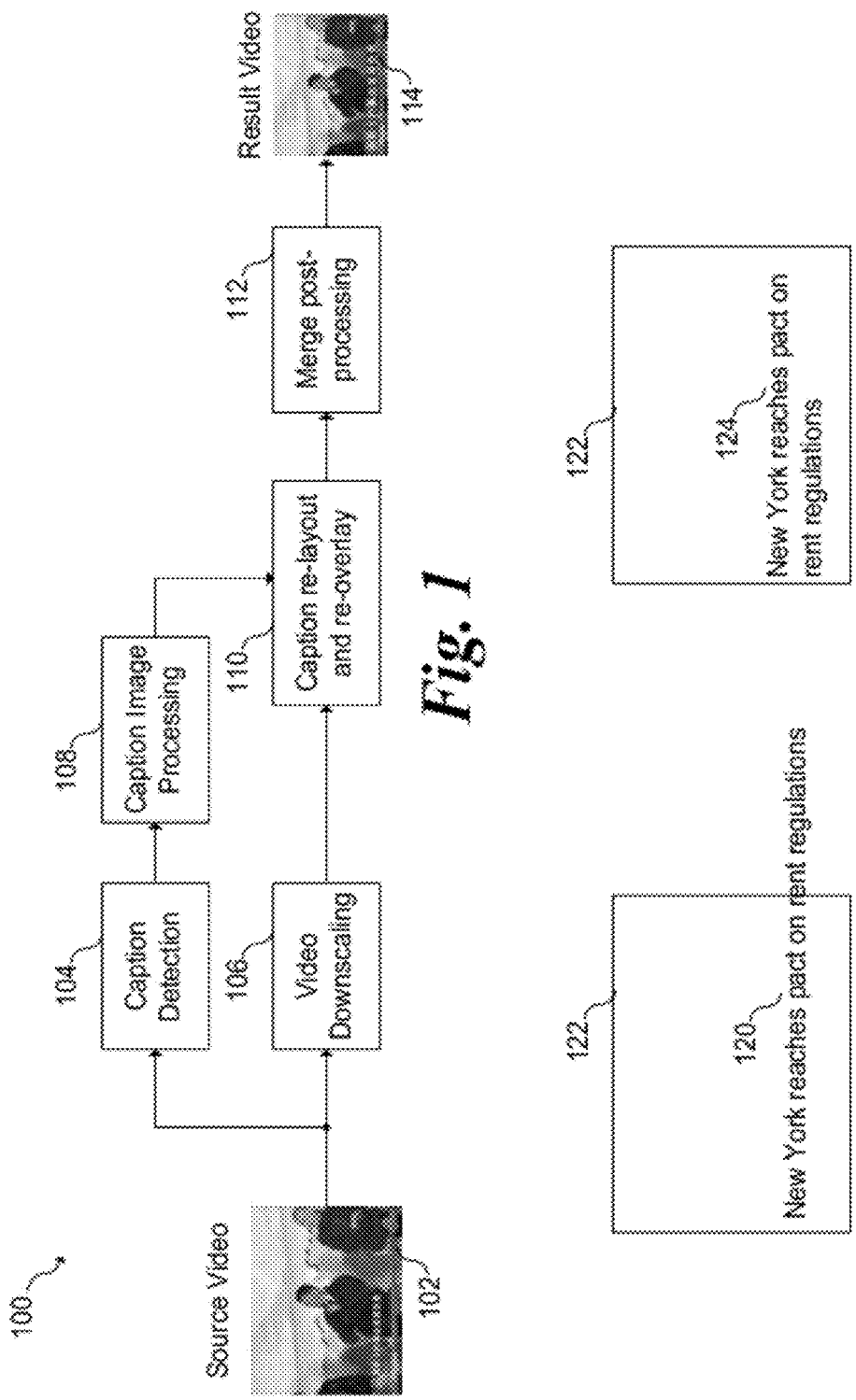

SYSTEM AND METHOD FOR VIDEO CAPTION RE-OVERLAYING FOR VIDEO ADAPTATION AND RETARGETING

This application claims the benefit of U.S. Provisional Application No. 61/481,421, filed on May 2, 2011, entitled "System and Method for Video Caption Re-Overlaying for Video Adaptation and Retargeting," which application is hereby incorporated herein by reference.

TECHNICAL FIELD

The present invention relates to image processing, and, in particular embodiments, to a system and method for video caption re-overlaying for video adaptation and retargeting.

BACKGROUND

Mobile content is any type of media that is viewed or used on mobile devices, such as ringtones, graphics, discount offers, games, movies, and GPS navigation. As mobile phone use has grown since the mid 1990s, the significance of the devices in everyday life has grown accordingly. Owners of mobile phones can now use their devices to make calendar appointments, send and receive text messages (SMS), listen to music, watch videos, shoot videos, redeem coupons for purchases, view office documents, get driving instructions on a map, and so forth. The use of mobile content has grown accordingly.

With the advent of faster mobile networks, having video displays on small screen devices has become more and more practical. Mobile video comes in several forms including 3GPP, MPEG-4, Real Time Streaming Protocol (RTSP) and Flash Lite. Mobile video can also be transmitted and received come in the form of streaming video programming over a mobile network. Live video can also be streamed and shared via cell phones.

Subtitles are textual versions of the dialog in films and television programs, usually displayed at the bottom of the screen. They can either be a form of written translation of a dialog in a foreign language or a written rendering of the dialog in the same language, with or without added information to help viewers who are deaf and hard-of-hearing to follow the dialog, or to assist people who cannot understand the spoken dialogue or who have accent recognition problems to understand the programming. Closed captioning is the process of displaying text on a television, video screen or other visual display to provide additional or interpretive information to individuals who wish to access it. Closed captions typically show a transcription of the audio portion of a program as it occurs (either verbatim or in edited form), sometimes including non-speech elements. Generally, subtitles are graphics that appeal in the video picture itself, while closed captioning are transmitted as data along with the video signal and are inserted in the video image by the receiving device.

SUMMARY OF THE INVENTION

In accordance with an embodiment, a method of processing an electronic image having caption text includes receiving the electronic source image, detecting the caption text in the electronic source image, reformatting the electronic source image, reformatting the caption text, and overlaying the reformatted caption text on the reformatted electronic image to form a resultant image.

In accordance with another embodiment, a system for reformatting video caption text includes a video reformatting block having an input coupled to an input video source and an output configured to produce a reformatted video source. The system also includes a caption detection block configured to extract caption text in the video source, and a caption re-layout and re-overlay block coupled to the output of the video reformatting block and an output of the caption detection block. The caption re-layout and re-overlay block is configured to reformat the extracted caption text and overlay the reformatted caption text in the reformatted video source.

In accordance with a further embodiment, a non-transitory computer readable medium with an executable program stored thereon, wherein the program instructs a microprocessor to perform the steps of receiving a video source image, detecting caption text in the video source image, reformatting the video source image, reformatting the caption text, and overlaying the reformatted caption text on the reformatted video source image to form a resultant image.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 1 provides a block diagram of a video caption re-overlaying system;

FIGS. 2a-b illustrates an example of an embodiment caption re-layout and overlay;

DETAILED DESCRIPTION OF ILLUSTRATIVE EMBODIMENTS

Figure 3:
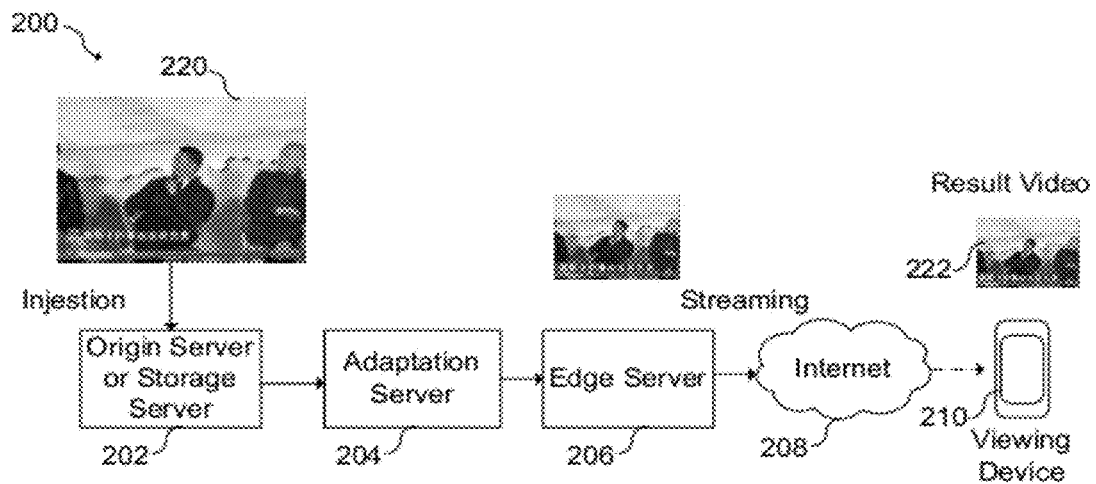
FIG. 3 illustrates an application scenario of an embodiment of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments of the present invention disclose a system and method for processing a video image. An example method includes, detecting caption text, e.g., using a computer vision based detection algorithm, cropping the detected caption text from the video frames, separately resizing the cropped caption text and remaining portions of the video frames, and overlaying the resized caption text back over re-sized video frames. The method may also include a post-processing procedure to merge the re-overlaid caption text more seamlessly with background.

In embodiments of the present invention, overlay caption text is text added on videos during video post-processing pipelines to display voice transcript (e.g., for foreign movies or closed captioning) or to convey other information. In the process of video adaptation and retargeting to small-screen devices, such as mobile phones, high resolution (high-res) videos (e.g., HD resolution) are downscaled to lower resolution videos for suitable for small displays. The overlay captions are also scaled down along with the rest of video content. As a result, the overlay caption text may become too small to be readable.

One solution to address this issue is to visually enhance the caption text through image enhancement or by changing coding parameters so that more bits are allocated to overlay text during encoding. But on small-screen devices, the main problem may be the small size of the text rather than other visual properties. Some embodiments of the present invention, therefore, provide a technique to display captions (or other information) in video that is displayed on a smaller screen size (e.g., mobile video). In embodiments of the present invention, overlay caption text is text added on videos during video post-processing pipelines to display voice transcript or convey other information. This processing may advantageously be used in video adaptation and retargeting to small-screen devices.

Embodiments of the present invention further include a system and method for preserving the visual quality of overlay caption text by re-overlaying the high-resolution caption text cropped from the input high-resolution video onto the downscaled video. First, caption text is detected using a computer vision based detection algorithm. Then, the detected caption text is cropped from the video frames for separate processing, such as contrast adjustment. After video frames are resized to small sizes, the caption text is overlaid back on the re-scaled video frames after appropriate resizing and re-layout. The downscaling ratio of caption text is typically smaller than the downscaling ratio of the video frames during the process, thus resulting in proportionally larger and more visible caption text on the downscaled videos compared to regular uniform downsizing. A post-processing procedure is further carried out to merge the re-overlaid caption text more seamlessly with background.

A first embodiment of the invention is shown in FIG. 1, which provides a block diagram of video caption re-overlaying system 100. Source video 102 is provided as input to video downscaling block 106 and caption detection block 104. Caption image processing block 108 performs image processing on the detected caption, and caption re-layout and re-overlay block 110 combines the downscaled video and detected caption. Merge post-processing block 112 performs further processing on the combined image to produce resultant video 114.

In an embodiment, source video 102 is a regular high definition (HD) or standard definition (SD) video, although other image resolution types including, but not limited to, DCIF, 16CIF, 4SIF, CIF, and SIF can equally benefit from the techniques discussed herein. In this example, the result video is a video for mobile device, with a resolution such as 480× 320. In a mobile video adaption scenario, the videos are downscaled to fit into small displays. In alternative embodiments, other image types and resolutions can be used for the source video and for the resultant video.

In FIG. 1, the caption detection block 104 uses an automatic caption detection algorithm to detect the caption area represented as bounding boxes or other forms. After caption areas are detected, they are cropped and fed into the caption image processing block 108. Caption image processing block 108 performs caption image enhancement processing, for example adjusting the contrast, sharpening the edges of the detected caption, or other image processing operations including, but not limited to de-noising and histogram equalization.

In an embodiment, caption detection block 104 is used to detect the location of the captions in a video frame. In some embodiments, caption detection techniques described in the following publications are used: Zhang, et al, *Temporally Consistent Caption Detection in Videos Using a Spatiotemporal 3D Method*, IEEE International Conference in Image Processing (ICIP) 2009, pp. 1881-4, and Zhang, et al, *General and Domain-Specific Techniques for Detecting and Recognizing Superimposed Text in Video*, IEEE International Conference in Image Processing (ICIP) 2002, pp. 1-593-6, which are incorporated herein by reference in their entirety.

An embodiment caption detection workflow includes three steps: feature extraction, candidate pixel grouping and post-filtering. In the feature extraction step, features, such as texture and motion features, are extracted around each pixel in a video frame. The pixel is determined to be caption candidate pixel or not based on the features. The decision process can be realized by automatic classification. The candidate pixel grouping step then groups together candidate pixels that are nearby to each other to form blobs. Each blob could be a potential text area. Some geometric rules are then enforced to remove implausible blobs. One example of such a rule is preventing an aspect ratio of a region from becoming too large. Finally, a post-filtering process is applied to remove possible false positive regions with temporal filtering. In one embodiment, the outputs of caption detection algorithm are bounding boxes of the caption text. The caption images are cropped from the video frames using the bounding box outputs. In alternative embodiments, an input video frame is divided into blocks, and a classification algorithm is directly performed for each block to determine whether or not a block contains caption text. In such an implementation, the feature extraction stage may be avoided.

In some embodiments, caption image processing block 108 pre-processes the extracted caption images. A variety of preprocessing processes can be applied including, but not limited to, increasing contrast and sharpening the edges of the captions. In alternative embodiments, other image processing operations can be applied. In further embodiments, caption image processing block 108 may be omitted.

The video downscaling block performs video downscaling to resize the video to small sizes using techniques known in the art. In some embodiments, the video downscaling block further resizes the caption images into smaller sizes. By downscaling the video, large-sized videos may be converted into smaller videos to fit into small screens, such as those used in portable electronic devices such as smart phones. In an embodiment, the downscaling function can be realized by standard down scaling algorithms, for example, using certain open source software, such as OpenCV or other algorithms. In embodiments the downsizing operation is also applied both to the video frames and to the extracted captions. In order to make the caption proportionally larger and easier to see by human eyes, the downsizing ratio of caption images is made smaller than that of the video frames depending on the downsizing ration and the respective video formats.

In embodiments, video downscaling block 106 can also affect a change in video format such as aspect ratio. In further embodiments, the aspect ratio of the video may be adjusted without downscaling the video. In further embodiments, system 100 may have an upscaling block (not shown) that upscales the video in place of or in addition to downscaling block 106.

Caption re-layout and re-overlay block 110 gets the enhanced caption images and re-layouts the caption images if the detected captions contain more than one image piece in some embodiments. After re-layout, the result caption image is re-overlaid on the downscaled video. Caption re-layout and re-overlay block 110 overlays the extracted, processed and separately resized caption boxes on the downsized input video. Because the downsizing ratio of the caption boxes may be smaller than that of video frames, one potential issue is that the overlaid caption boxes could extend outside the bound of the video frames. Therefore, in some embodiments, the caption boxes are reformatted first before they are overlaid.

A number of methods can be used to reformat the caption boxes. For example, one method is to chop a long text line into two or multiple lines. In order to avoid fragmentation of characters, a character segmentation algorithm, such at those using projection profiles of caption text images described in *General and Domain-Specific Techniques for Detecting and Recognizing Superimposed Text in Video*, may be used to first find the character segmentation points, and only chop the text lines at the segmentation points. An example of an output of such an algorithm is illustrated in FIGS. 2a-b. FIG. 2a illustrates text line 120 that is longer than video frame 122, and FIG. 2b illustrates text line 124 in video frame 122 after it has been reformatted to divide the line in two. In other embodiments, other re-layout operations can be performed. After re-layout, the caption box is overlaid on the video frames, for example, by replacing the image content within the replacing rectangle in the video frames with the content in the separately resized caption image. In an embodiment, the replacing rectangle has the same size of the separately resized caption image, and its left-top corner is determined during the re-layout process.

In some embodiments, optional merge post-processing block 112 merges the processed caption image on the video frames with a seamless merging algorithm so that the processed frame is a more natural looking and appears to be free of artifacts. In one embodiment, a Poisson Image Editing (PIE) is used as described, for example, in Perez, et al., *Poisson Image Editing*, Proceedings of ACM SIGGRAPH 2003, vol. 22, pp. 313-18, which is incorporated herein by reference in their entirety. PIE is a method that uses Partial Differential Equation (PDE) based methods to composite the overlaid small image on a large image while enforcing the smooth transition between the objects and the underlying image. In alternative embodiments, other existing image blending algorithms, such as applying smoothing filters around the replacing rectangle, may also be used for the merging process. FIG. 2 shows a typical system architecture that uses the invented method in a typical CDN (content distribution network) application scenario.

FIG. 3 illustrates embodiment streaming video system 200 which takes source video 220 as an input and sends result video 222 suitable for viewing on mobile device 210. System 200 may use embodiment systems and methods in a content distribution network (CDN) application scenario. In one embodiment, origin or source server 202 ingests source video 220 that is provided, for example, by content providers. Adaptation server 204 then performs video adaption or adaptation tasks, for example, video transcoding. Embodiments of the system of the present invention can be performed in conjunction with the transcoding process. The adapted videos are then cached at one or more edge server 206, which are closer to clients. Edge server 206 streams the adapted videos via the Internet 208 or other network to viewing device 210. Viewing device 210 may be for, example, a mobile phone, computer, smart phone, or other consumer or non-consumer device.

Figure 4:
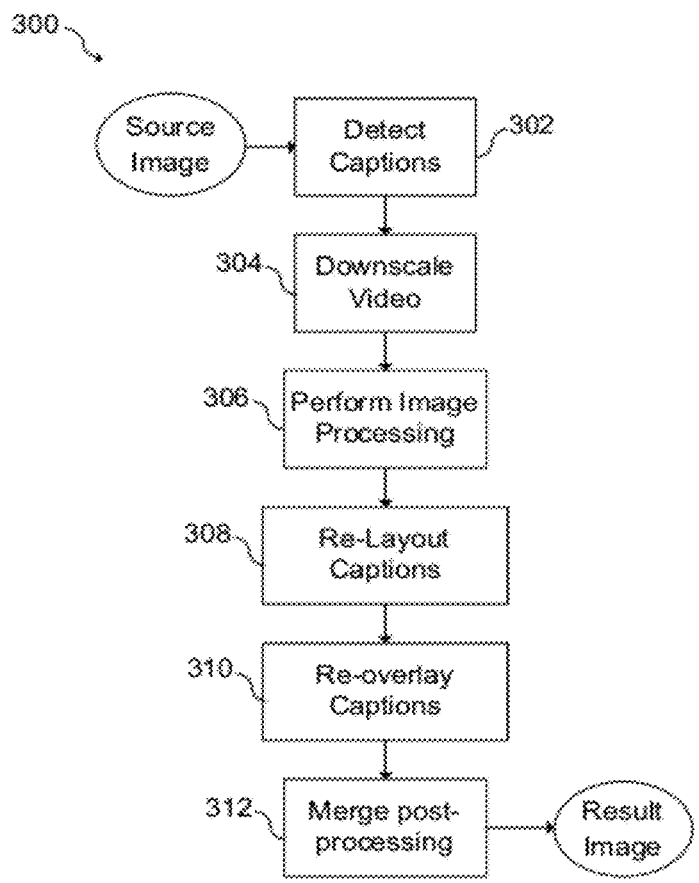
FIG. 4 illustrates a flow-chart of an embodiment method.

FIG. 4 illustrates flow chart 300 of an embodiment method. In step 302, captions are detected in an input image. In one embodiment, the image is a video image; however, other image types may be used, such as a still image. Next, in step 304 the input image is downscaled. In some embodiments, steps 302 and 304 may be performed simultaneously. In step 306, image processing is performed on the captions, and in step 308, the captions are reformatted according to the downscaled video downsizing ratio. In some embodiments, the downsizing ratio applied to the captions is less than the downsizing ratio applied to the rest of the image in order for the captions to remain visible and readable to a person viewing the reduced picture size.

In step 310, the captions are re-overlaid on the image by placing the reformatted caption image into the downscaled video frame. Lastly, in step 312, the captions and image are merged to form a merged image. In some embodiments, post-processing is applied to make the captions overlaid on the image look more natural by smoothing the stitching boundary, as described in embodiments above.

Figure 5:
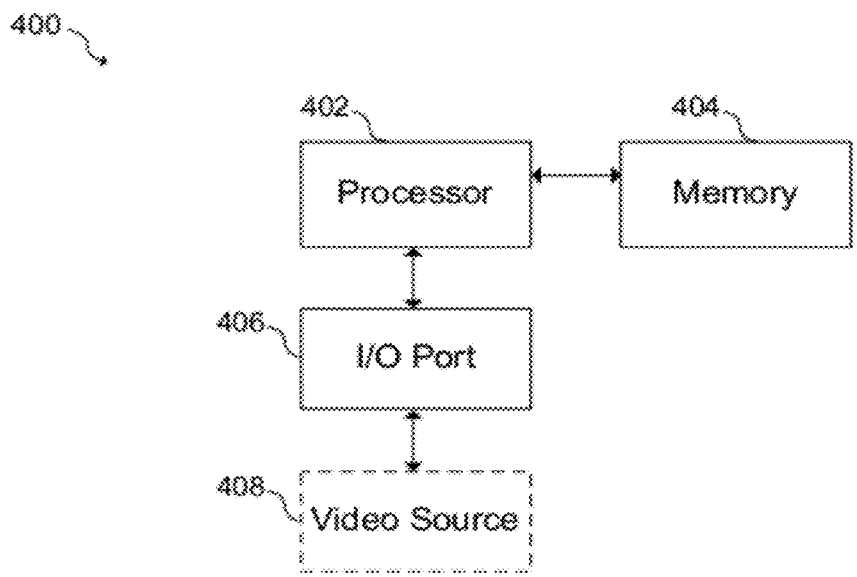
FIG. 5 illustrates a processing system that can be utilized to implement methods of the present invention.

FIG. 5 illustrates a processing system 400 that can be utilized to implement methods of the present invention. In this case, the main processing is performed in processor 402, which can be a microprocessor, digital signal processor or any other appropriate processing device. In some embodiments, processor 402 can be implemented using multiple processors. Program code (e.g., the code implementing the algorithms disclosed above) and data can be stored in memory 404. Memory 404 can be local memory such as DRAM or mass storage such as a hard drive, optical drive or other storage (which may be local or remote). While the memory is illustrated functionally with a single block, it is understood that one or more hardware blocks can be used to implement this function.

In one embodiment, processor 402 can be used to implement various ones (or all) of the units shown in FIG. 1. For example, the processor can serve as a specific functional unit at different times to implement the subtasks involved in performing the techniques of the present invention. Alternatively, different hardware blocks (e.g., the same as or different than the processor) can be used to perform different functions. In other embodiments, some subtasks are performed by processor 402 while others are performed using a separate circuitry.

FIG. 5 also illustrates an I/O port 406, which can be used to provide the video and/or image data to and from the processor. Video source 408 (the destination is not explicitly shown) is illustrated in dashed lines to indicate that it is not necessary part of the system. For example, the source can be linked to the system by a network such as the Internet or by local interfaces (e.g., a USB or LAN interface).

In an embodiment, a method of processing an electronic image having caption text includes receiving the electronic source image, detecting the caption text in the electronic source image, reformatting the electronic source image, reformatting the caption text, and overlaying the reformatted caption text on the reformatted electronic image to form a resultant image. Reformatting the electronic source image may include downscaling the electronic source image using a first downscaling ratio, and reformatting the caption text may include downscaling the caption text using a second downscaling ratio. In one embodiment, the first downscaling ratio is greater than the second downscaling ratio. The electronic source image may include a video image that is, for example, a high-definition video image, and the resultant image may include a low-definition image for mobile video. Alternatively, other image types may be used.

In an embodiment, the method also includes post-processing the reformatted caption text and the reformatted electronic image. Post-processing may include applying an image blending algorithm to the reformatted caption text and the reformatted electronic image. In some embodiments, detecting the caption text includes extracting features of the caption text, and grouping candidate pixels of the caption text based on the extracted features.

In some embodiments, the method further includes cropping the caption text from the electronic source image based on the detecting the caption text, and in some embodiments, reformatting the caption text may include dividing a line of the caption text into a plurality of lines.

In an embodiment, a system for reformatting video caption text includes a video reformatting block, a caption detection block, and a caption re-layout and re-overlay block. The video reformatting block has an input coupled to an input video source and an output configured to produce a reformatted video source, and the caption detection block is configured to extract caption text in the video source. The caption re-layout and re-overlay block is coupled to the output of the video reformatting block and an output of the caption detection block. In an embodiment, the caption re-layout and re-overlay block configured to reformat the extracted caption text and overlay the reformatted caption text in the reformatted video source.

In an embodiment, the system further includes a caption image processing block coupled between the caption detection block and the caption re-layout and re-overlay block. The caption image processing block may be configured to pre-process the extracted captions. In some embodiments, the caption image processing block is configured to adjust a contrast of the extracted captions, and in some embodiments, the video reformatting block is configured to reduce a resolution of the video source.

The system may also include a merge post processing block coupled to an output of the caption re-layout and re-overlay block, where the merge post processing block configured to visually blend the reformatted caption text with the reformatted video source. In some embodiments, the caption re-layout and re-overlay block is configured to divide a line of caption text into a plurality of lines. Also, in some embodiments, the video reformatting block, the caption detection block, and the caption re-layout and re-overlay block may be implemented, for example, by software running on a computer server.

In an embodiment, a non-transitory computer readable medium has an executable program stored thereon. The program instructs a microprocessor to perform the steps of receiving a video source image, detecting caption text in the video source image, reformatting the video source image, reformatting the caption text, and overlaying the reformatted caption text on the reformatted video source image to form a resultant image. In some embodiments, reformatting the video source image includes downscaling the electronic source image using a first downscaling ratio, and reformatting the caption text comprises downscaling the caption text using a second downscaling ratio. The first downscaling ratio may be greater than the second downscaling ratio.

In an embodiment, the program further instructs the microprocessor to perform post-processing on the reformatted caption text and the reformatted video source image. In an embodiment the step of detecting the caption text may include extracting features of the caption text, and grouping candidate pixels of the caption text based on the extracted features. Furthermore, the step of reformatting the caption text may include dividing a line of the caption text into a plurality of lines.

Advantages of embodiments include the ability to make video captions more readable on small-screen devices, such as mobile phones. For example, in one embodiment, the system and method detects the caption area, processes the detected caption area, rescales and re-lays out the caption area, and overlays the processed captions onto the downscaled videos in the video adaption and retargeting process to improve caption visibility.

The process of performing a re-layout of the detected captions is also an advantageous feature, as detected captions may include multiple fragmented pieces. In some cases, if these detected captions are overlaid on the video frame with the original spatial arrangement, the captions may not be fit into the downsized video frames. Embodiment re-layout process may be used to make sure that the caption can be re-overlaid within the frame boundary. In some embodiments, the re-layout process is performed using a predefined set of layout rules.

The re-overlay and post-processing process that overlays the captions onto the downsized video frames in proper locations is another advantageous feature. This embodiment process can merge the caption images with the underlying video content without apparent editing artifacts. The caption merge process can be realized by certain existing image processing algorithms, such as Poisson image editing.

Furthermore, embodiments of the present invention can be utilized in a number of contexts. For example, embodiments can be incorporated into a component or module in a content delivery network (CDN) or media cloud product. This component can preserve the visual quality of caption text for videos played in small-screen devices. The quality of the overlaid text is preserved after videos are retargeted for small-screen devices.

As one benefit, media users have a better quality experience viewing video content played on small-screen devices, such as mobile phones. The quality of overlay captions on videos are preserved when videos are transmitted to small-screen devices, such as mobile phones, or/and in a low-bandwidth environment.

Figure 6:
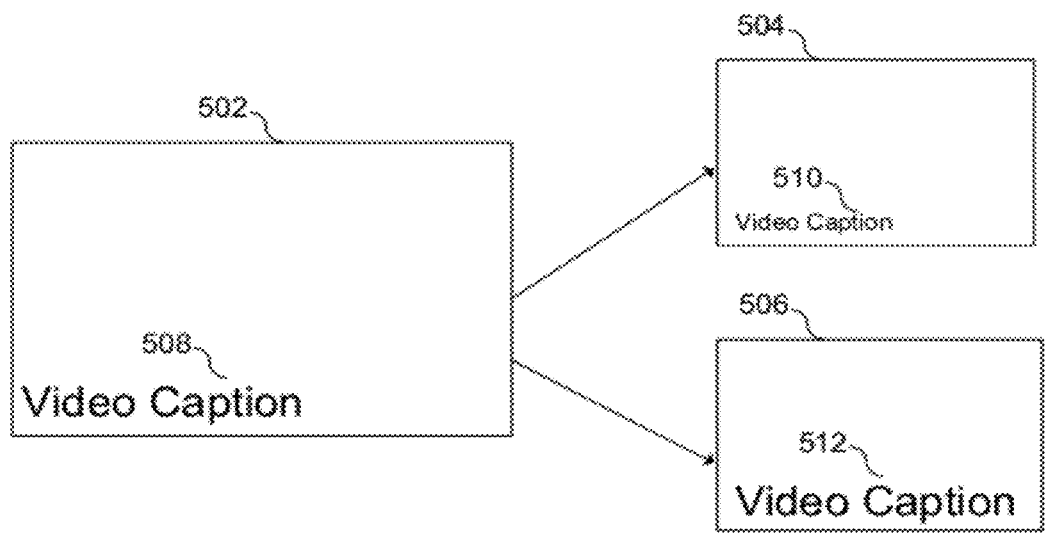
FIG. 6 illustrates a comparison between a video frame where the caption has been re-sized and a video frame where the caption has not been re-sized.

FIG. 6 illustrates an further advantage of some embodiments of the present invention. Video frame 502 represents an input image, and video from 504 illustrates downscaled version of image 502. As illustrated, text caption 510 in downscaled frame 504 is visibly smaller than text caption 508 in original video frame 502. Frame 506, on the other hand has text caption 512 is separately re-sized according to embodiment systems and methods. The size of video caption in frame 506 is, therefore, visibly larger than caption 510 in downscaled frame 504.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of processing an electronic image having caption text, the method comprising:
   receiving an electronic source image;
   detecting the caption text in the electronic source image, wherein the caption text comprises graphics within a boundary of a graphical region of the electronic source image;
   reformatting the electronic source image, wherein reformatting the electronic source image comprises downscaling the electronic source image using a first downscaling ratio;
   reformatting the caption text, wherein reformatting the caption text comprises downscaling the caption text using a second downscaling ratio different from the first downscaling ratio; and
   overlaying the reformatted caption text on the reformatted electronic image to form a resultant image.

2. The method of claim 1, wherein the first downscaling ratio is greater than the second downscaling ratio.

3. The method of claim 1, wherein the electronic source image comprises a video image.

4. The method of claim 1, wherein the electronic source image comprises a high-definition video image and the resultant image comprises a low-definition image for mobile video.

5. The method of claim 1, further comprising post-processing the reformatted caption text and the reformatted electronic image.

6. The method of claim 5, wherein post-processing comprises applying an image blending algorithm to the reformatted caption text and the reformatted electronic image.

7. The method of claim 1, wherein detecting the caption text comprises:
   extracting features of the caption text; and
   grouping candidate pixels of the caption text based on the extracted features.

8. The method of claim 1, further comprising cropping the caption text from the electronic source image based on the detecting the caption text.

9. The method of claim 1, wherein reformatting the caption text comprises dividing a line of the caption text into a plurality of lines.

10. A system for reformatting video caption text, the system comprising:
    a video reformatting block having an input coupled to an input video source and an output configured to produce a reformatted video source by downscaling a video image provided by the input video source using a first downscaling ratio;
    a caption detection block configured to extract caption text in the video source, wherein the caption text comprises graphics within a boundary of a graphical region of the input video source; and
    a caption re-layout and re-overlay block coupled to the output of the video reformatting block and an output of the caption detection block, the caption re-layout and re-overlay block configured to reformat the extracted caption text by downscaling the extracted caption text using a second downscaling ratio different from the first downscaling ratio, and overlay the reformatted caption text in the reformatted video source.

11. The system of claim 10, further comprising a caption image processing block coupled between the caption detection block and the caption re-layout and re-overlay block, the caption image processing block configured to pre-process the extracted captions.

12. The system of claim 11, wherein the caption image processing block is configured to adjust a contrast of the extracted captions.

13. The system of claim 10, wherein the video reformatting block is configured to reduce a resolution of the video source.

14. The system of claim 10, further comprising a merge post processing block coupled to an output of the caption re-layout and re-overlay block, the merge post processing block configured to visually blend the reformatted caption text with the reformatted video source.

15. The system of claim 10, wherein the caption re-layout and re-overlay block is further configured to divide a line of caption text into a plurality of lines.

16. The system of claim 10, wherein the video reformatting block, the caption detection block, and the caption re-layout and re-overlay block are implemented by software running on a computer server.

17. A non-transitory computer readable medium with an executable program stored thereon, wherein the program instructs a microprocessor to perform the following steps:
    receiving a video source image;
    detecting caption text in the video source image, wherein the caption text comprises graphics within a boundary of a graphical region of the video source image;
    reformatting the video source image, wherein reformatting the video source image comprises downscaling the video source image using a first downscaling ratio;
    reformatting the caption text, wherein reformatting the caption text comprises downscaling the caption text using a second downscaling ratio different from the first downscaling ratio; and
    overlaying the reformatted caption text on the reformatted video source image to form a resultant image.

18. The non-transitory computer readable medium of claim 17, wherein the first downscaling ratio is greater than the second downscaling ratio.

19. The non-transitory computer readable medium of claim 17, wherein the program further instructs the microprocessor to perform post-processing on the reformatted caption text and the reformatted video source image.

20. The non-transitory computer readable medium of claim 17, wherein the step of detecting the caption text comprises:
    extracting features of the caption text; and
    grouping candidate pixels of the caption text based on the extracted features.

21. The non-transitory computer readable medium of claim 17, wherein the step of reformatting the caption text comprises dividing a line of the caption text into a plurality of lines.

22. A method of processing an electronic image having caption text, the method comprising:
    receiving an electronic source image;
    detecting the caption text in the electronic source image;
    reformatting the electronic source image;
    reformatting the caption text; and
    overlaying the reformatted caption text on the reformatted electronic image to form a resultant image, wherein the electronic source image comprises a high-definition video image and the resultant image comprises a low-definition image for mobile video.

* * * * *